Feb. 13, 1940.    J. ZIMKA ET AL    2,190,279
AUTOMOTIVE VEHICLE CONSTRUCTION
Filed Dec. 24, 1938
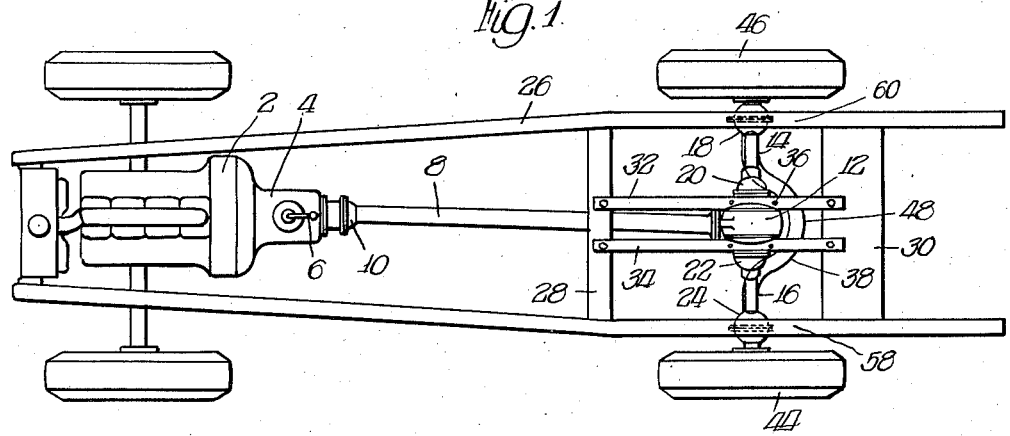
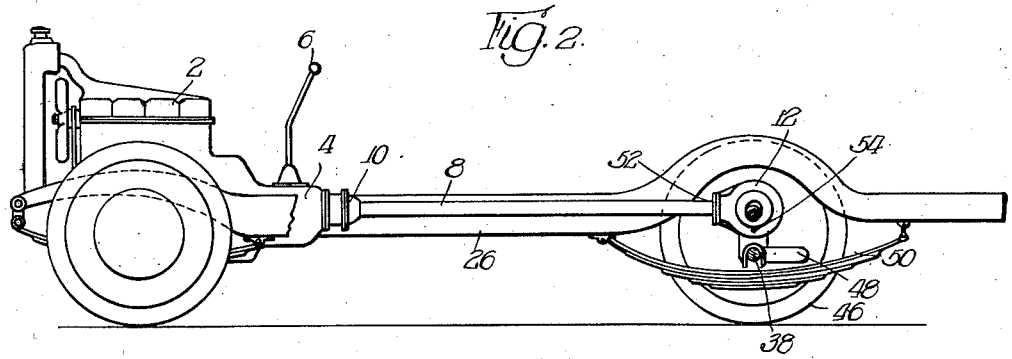
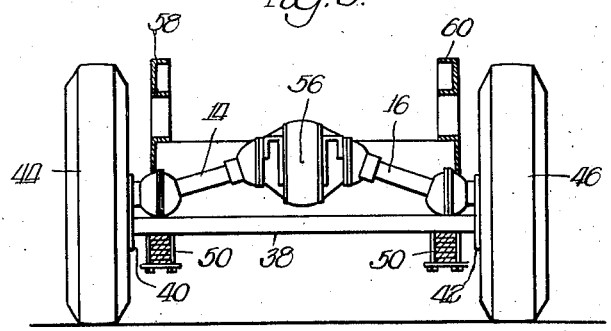
INVENTOR.
John Zimka
Frank Miller
BY Richard Spencer
ATTORNEY.

Patented Feb. 13, 1940

2,190,279

UNITED STATES PATENT OFFICE 2,190,279

AUTOMOTIVE VEHICLE CONSTRUCTION

John Zimka and Frank Miller, Chicago, Ill.

Application December 24, 1938, Serial No. 247,657

2 Claims. (Cl. 180—73)

This invention relates to a new and improved type of automotive vehicle and more particularly a new and improved type of truck having a new and improved type of rear wheel drive.

In the ordinary type of truck, the body of the vehicle is generally relatively high from the ground, as, for instance, from about two and one-half feet to about three feet. This is caused to a large extent by the fact that most trucks have a drive shaft running through the center of the truck from the transmission in the front to a differential mounted on the axle in the rear. In order to provide a flat floor space in the body of the truck it is necessary to elevate it above this drive shaft. The driver's compartment in such trucks is usually on a different level from the carrier portion of the truck and no means are provided by which the driver may walk directly from his compartment through the carrier portion of the truck without stooping.

On account of the distance of the truck floor from the ground most trucks of the type used in delivering bakery products, milk and other commodities which may be stacked or arranged on shelves within the truck have an over-all height of at least eight feet, and a step or running board is usually required in order for the driver to reach his compartment.

One of the objects of this invention is to provide a new and improved type of truck which has a low body structure and a low over-all height.

A further object is to provide a truck suitable for use in carrying bakery products, milk and similar commodities which has a low floor and in which the floor is so constructed that the driver's compartment and the carrier or load portion of the truck are on the same floor level and the driver can readily go from one to the other without stooping.

Another object of this invention is to provide a new and improved type of rear wheel drive mechanism which is especially adapted for making automotive vehicles of low body structure and by means of which the weight of the differential is substantially all sprung weight rather than dead weight.

Other objects will appear from a reading of the following specification as the description proceeds.

In accordance with this invention we provide an automotive vehicle in which the differential is fastened solidly to the frame of the vehicle in any suitable manner and has drive axles associated therewith in such a way that the differential may be displaced upwardly or downwardly without interfering with the driving operation of the wheels. As a further feature of the invention an independent axle is provided between the mountings for the rear wheels having an offset therein so that the differential is free to move up and down in said offset. It is preferable in accordance with our invention that the differential be so arranged that it is displaced downwardly by the normal load on the vehicle to a position in which the center thereof is in proximity to a line joining the centers of the wheels. The independent axle between the wheels may be connected to the springs and is preferably below a line joining the centers of the wheels. By this type of construction it is possible to make a truck or other automotive vehicle having a very low center of gravity and likewise having a very low floor level.

The novel features and structures of said invention together with the advantages thereof will be more fully understood from a reading of the accompanying specification in conjunction with the accompanying drawing in which:

Figure 1 represents a plan view of a truck chassis showing the engine and driving mechanism mounted in accordance with the present invention;

Figure 2 represents a view in elevation, of Figure 1;

Figure 3 represents an end view of Figure 1 looking toward the rear of the vehicle.

Referring to Figures 1 and 2, the truck illustrated comprises an engine 2 of conventional design, a change speed transmission 4, also of conventional design, a conventional gear shift lever 6, a propeller shaft or torque tube 8, a universal joint 10 connecting the propeller shaft to drive shafts in transmission 4, a differential 12 mounted in the rear of the vehicle and drive axles 14 and 16 adapted to drive the rear wheels. It will be observed that drive axle 14 contains at each end a universal joint 18 and 20, respectively, and drive axle 16 is provided with universal joints 22 and 24. Across the frame 26 of the vehicle are transverse members 28 and 30 carrying longitudinal members 32 and 34 which in turn are solidly fastened to differential 12 by bolts 36, or by any other suitable means, as generally illustrated in Figure 1.

As shown in Figures 1, 2 and 3, an independent axle 38 is mounted between mountings 40 and 42 of wheels 44 and 46, respectively (Figure 3). Axle 38 has an offset or curved portion 48 which permits differential 12 to move up and down as the load is decreased or increased on the truck. It will be observed that springs 50 are associated directly with independent axle 38 and also with frame 26. A universal joint may also be provided at point 52 to connect the propeller shaft 8 with differential 12. The arrangement shown in Figures 1 and 2 is preferred, however, because it provides a simpler form of construction which permits torque from the wheels to be taken up directly by the torque tube.

According to the arrangement described, independent axle 38 is positioned beneath a line joining the centers 54 (Figure 2) of wheels 44 and 46. The center 56 of differential 12 is normally above the line joining the centers of wheels 44 and 46 but is adapted to be displaced downwardly by a load on the vehicle to a position in which the center 56 of differential 12 is in proximity to a line joining the centers of the rear wheels 44 and 46.

In this construction it will be noted that the weight of the differential is supported by the frame and, therefore, does not fall on drive axles 14 and 16. Moreover, this arrangement makes it possible to have a very strong rear end construction for a truck while at the same time lowering the floor level of the truck.

In the form of the invention shown in Figure 2 the floor level of the truck may be slightly above the top of frame 26 so that it just clears the top of differential 12. In this way a truck is provided having a flat uniform floor level extending from the loading compartment through the driver's compartment. Since the differential is associated directly with the frame of the vehicle its position and the position of propeller shaft 8 is fixed with respect to the floor level and in order to secure a low floor construction and a low overall height it is unnecessary to have a hump or other projection running through the middle of the floor, as is customary in the usual type of rear wheel drive vehicle where a low floor level is desired.

It will be understood that the form of the invention above described is subject to variation without departing from the invention. For example, the rear wheels of the truck may be larger so that the line joining the centers running through point 54 of Figure 2 would be higher, thus making it possible to have the center 56 of differential 12 normally closer to the line joining the centers of the wheels. It will be understood also that by varying the size of the wheels, the line joining their centers may be above the center line 56 of differential 12 in normal and/or loaded position. The shape of the offset 58 in axle 38 may also be varied in any suitable manner. The top of the differential 12 may be flat instead of round in order to lower the position of the flooring of the truck. Curved portions 58 and 60 or frame 26 may be of greater or smaller diameter depending upon the size of the wheels.

It may be observed that according to the construction illustrated Figures 1, 2 and 3, the springs 50 are below axle 38, giving a center of gravity about three or four inches below that of the conventional truck. Other types of springs, for example spiral springs, may be employed instead of leaf springs. It will also be observed that the engine 2 is to the right of the center line of the truck, preferably about four inches or more, giving more room for the pedals and for the driver. Other variations will be apparent to those skilled in the art.

A suitable type of front wheel drive mechanism is claimed in our United States Patent No. 2,134,387. In both types of mechanisms it will be observed that a conventional engine is employed and the principal parts, such as transmission, gear shift, differential and the like are conventional thus making it possible to construct trucks of the type described economically and without numerous special parts and tools.

Having thus described the invention, what we claim as new and desire to secure by Letters Patent of the United States is:

1. In an automotive wheeled vehicle construction, the combination of, a vehicle frame, a differential gearing including a casing mounted on the frame at the rear of said vehicle, means solidly associating the top of said differential casing with said frame, wheels in the rear of said vehicle, mountings for said wheels, a rigid axle independent of the differential and rigidly connected with the mountings for said wheels, said axle extending transversely between said wheels below a line joining their centers and having a laterally extending offset near its central portion adapted to permit the differential casing to move up and down therein, longitudinally extending leaf springs attached to the frame at opposite sides independently of the differential casing and attached intermediate their ends to the lower face of said rigid axle at points substantially in the transverse vertical plane passing through the wheel axis, drive axles between the differential and said wheels, and a universal joint between each of said drive axles and said differential and between each of said drive axles and its associated wheel.

2. In an automotive wheeled vehicle construction, the combination of, a vehicle frame, an engine mounted on said frame in the front part of said vehicle, a differential gearing including a casing mounted on the frame in the rear of said vehicle, means solidly associating the top of said differential casing with said frame, propeller means comprising a torque tube connecting said engine and said differential, the connection between said torque tube and said differential casing being made rigidly, wheels in the rear of said vehicle, mountings for said wheels, drive axle means between said differential and said wheels adapted to drive said wheels while said differential is in different vertical positions with respect to a line joining the centers of said wheels, a rigid axle independent of the differential and rigidly connected with the mountings for said wheels, said axle extending transversely between said wheels below a line joining their centers and having a laterally extending offset near its central portion adapted to permit the differential casing to move up and down therein and springs connecting said frame with said rigid axle.

JOHN ZIMKA.
FRANK MILLER.